US012492577B2

(12) United States Patent
Tikkanen et al.

(10) Patent No.: US 12,492,577 B2
(45) Date of Patent: Dec. 9, 2025

(54) ELECTROMECHANICAL LOCK AND METHOD

(71) Applicant: iLOQ Oy, Oulu (FI)

(72) Inventors: Väinö Tikkanen, Oulu (FI); Mika Piirainen, Oulu (FI)

(73) Assignee: iLOQ Oy, Oulu (FI)

( * ) Notice: Subject to any disclaimer, the term of this patent is extended or adjusted under 35 U.S.C. 154(b) by 20 days.

(21) Appl. No.: 18/835,960

(22) PCT Filed: Feb. 6, 2023

(86) PCT No.: PCT/EP2023/052835
§ 371 (c)(1),
(2) Date: Aug. 5, 2024

(87) PCT Pub. No.: WO2023/148377
PCT Pub. Date: Aug. 10, 2023

(65) Prior Publication Data

US 2025/0116134 A1 Apr. 10, 2025

(30) Foreign Application Priority Data

Feb. 7, 2022 (EP) .................................... 22155355

(51) Int. Cl.
*E05B 47/00* (2006.01)
*E05B 47/06* (2006.01)

(52) U.S. Cl.
CPC ...... *E05B 47/0002* (2013.01); *E05B 47/0603* (2013.01); *E05B 2047/0007* (2013.01); *E05B 2047/0054* (2013.01)

(58) Field of Classification Search
CPC ... E05B 47/0002–0004; E05B 47/0603; E05B 2047/0007; E05B 2047/0054
(Continued)

(56) References Cited

U.S. PATENT DOCUMENTS 4,078,709 A * 3/1978 Jenkins ................ G11B 15/103 361/194
4,528,534 A * 7/1985 Read ..................... H01F 7/1607 335/262
(Continued)

FOREIGN PATENT DOCUMENTS

DE 102007016787 A1 10/2008
DE 102019116541 A1 12/2020
(Continued)

OTHER PUBLICATIONS

International Preliminary Report on Patentability for PCT/EP2023/052835, mailed May 28, 2024, 29 pages.
(Continued)

*Primary Examiner* — Nathan Cumar
(74) *Attorney, Agent, or Firm* — Nixon & Vanderhye PC

(57) ABSTRACT

The method includes: switching (1202), in a magnetically-operated actuator, between a first mechanical state and a second mechanical state using either a first internal magnetization configuration or a second internal magnetization configuration; after the switching (1202), measuring (1204), by a magnetic sensor, a prevailing magnetic field caused by the magnetically-operated actuator, testing (1206) the prevailing magnetic field against a predetermined condition, and based on the testing (1206), detecting (1208) whether the switching between the first mechanical state and the second mechanical state was completed or not completed.

15 Claims, 10 Drawing Sheets

Figure 1:
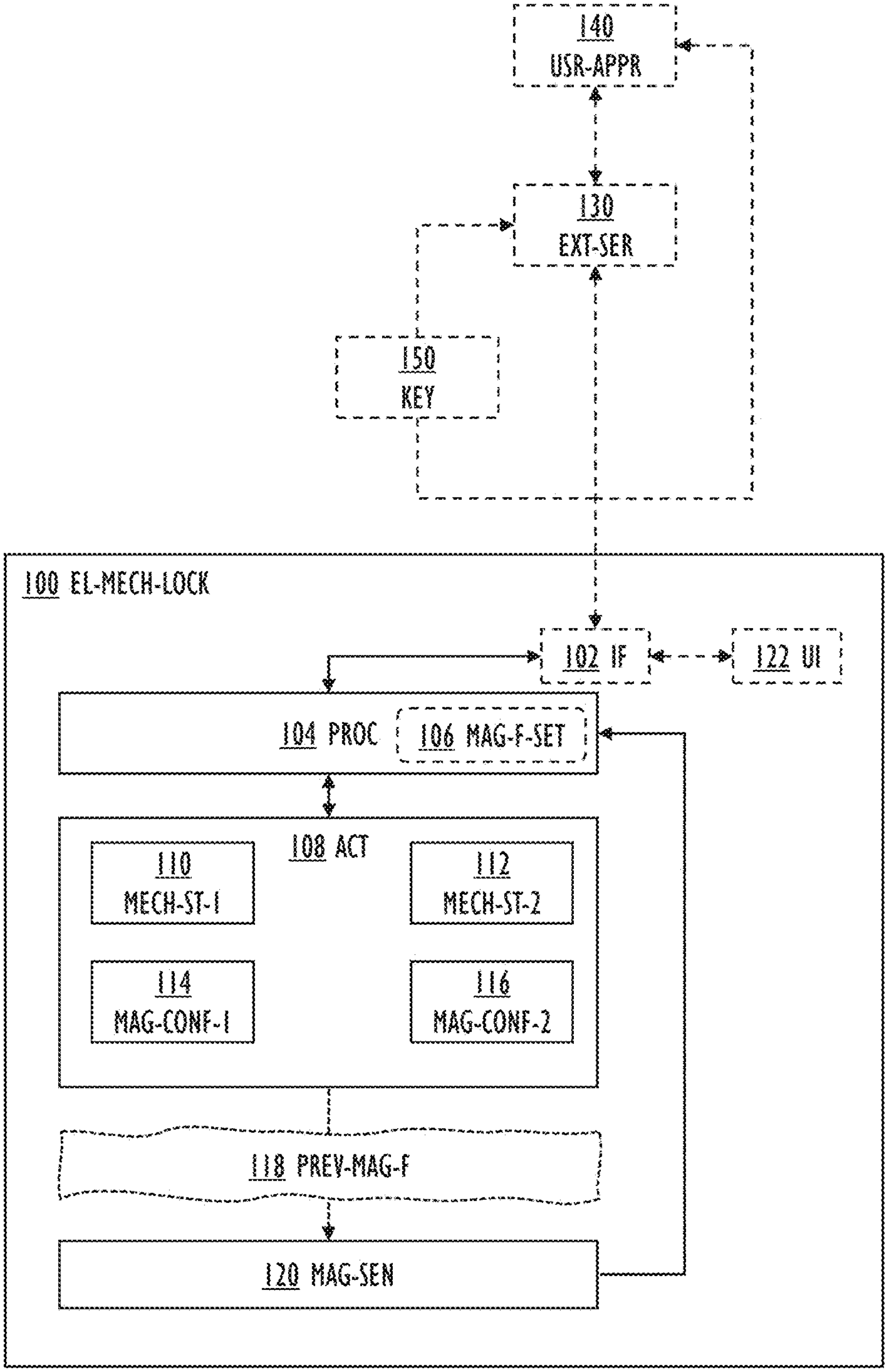

(58) Field of Classification Search
USPC ........................................................... 70/277
See application file for complete search history.

(56) References Cited

U.S. PATENT DOCUMENTS

| | | | | | |
|---|---|---|---|---|---|
| 5,044,678 | A * | 9/1991 | Detweiler | E05B 63/06 | 292/DIG. 60 |
| 5,138,291 | A * | 8/1992 | Day | H01F 7/1607 | 335/258 |
| 6,229,421 | B1 * | 5/2001 | Floyd | H01F 7/1607 | 335/229 |
| 6,639,496 | B1 * | 10/2003 | van Namen | H01F 7/1615 | 335/229 |
| 6,662,361 | B1 * | 12/2003 | Jackson | G06F 8/52 | 717/136 |
| 7,113,385 | B2 * | 9/2006 | Babich | H02K 26/00 | 361/170 |
| 8,074,961 | B2 * | 12/2011 | Clauss | F16K 31/0658 | 324/609 |
| 8,106,734 | B2 * | 1/2012 | Gruden | H01F 7/122 | 335/229 |
| 8,403,124 | B2 * | 3/2013 | Dimig | H01F 13/00 | 192/84.1 |
| 8,432,242 | B2 * | 4/2013 | Irwin | H01F 7/122 | 335/255 |
| 8,912,871 | B2 * | 12/2014 | Lauraire | H01H 3/28 | 335/229 |
| 9,431,162 | B2 * | 8/2016 | Cascolan | F16B 2/06 | |
| 10,443,269 | B2 * | 10/2019 | Piirainen | H02K 49/104 | |
| 2004/0169989 | A1 * | 9/2004 | Babich | H01F 7/1607 | 361/160 |
| 2008/0297288 | A1 * | 12/2008 | Irwin | H01F 7/122 | 335/254 |
| 2009/0072636 | A1 * | 3/2009 | Gruden | H01F 7/1615 | 310/14 |
| 2010/0008009 | A1 * | 1/2010 | Cartier-Millon | H01F 7/1872 | 361/156 |
| 2010/0127807 | A1 | 5/2010 | Hammond | | |
| 2010/0132418 | A1 * | 6/2010 | Chen | E05B 47/026 | 70/277 |
| 2013/0241680 | A1 * | 9/2013 | Hanchett, Jr. | H01F 7/16 | 335/234 |
| 2016/0099095 | A1 * | 4/2016 | Fernandes | H01R 12/79 | 361/152 |
| 2017/0193724 | A1 * | 7/2017 | Johnson | G07C 9/00309 | |
| 2019/0063632 | A1 * | 2/2019 | Schwobe | A62C 37/50 | |
| 2019/0103751 | A1 * | 4/2019 | Wang | H01F 38/14 | |
| 2019/0390393 | A1 * | 12/2019 | Promutico | G05B 9/02 | |
| 2020/0291683 | A1 * | 9/2020 | Tikkanen | E05B 47/063 | |
| 2021/0207399 | A1 * | 7/2021 | Piirainen | H01F 7/0221 | |

FOREIGN PATENT DOCUMENTS

| | | | | | |
|---|---|---|---|---|---|
| EP | 3745594 | A2 | | 12/2020 | |
| WO | WO-2020254324 | A1 | * | 12/2020 | E05B 63/146 |

OTHER PUBLICATIONS

International Search Report and Written Opinion of the ISA for PCT/EP2023/052835, mailed Apr. 26, 2023.
Extended European Search Report for EP 22155355.5, dated Jul. 29, 2022, 9 pages.

* cited by examiner

110

112

ELECTROMECHANICAL LOCK AND METHOD

CROSS-REFERENCE TO RELATED APPLICATIONS

This application is the U.S. national phase of International Application No. PCT/EP2023/052835 filed Feb. 6, 2023, which designated the U.S. and claims priority to EP 22155355.5 filed Feb. 7, 2022, the entire contents of each of which are hereby incorporated by reference.

FIELD

Various embodiments relate to an electromechanical lock, and to a method.

BACKGROUND

Electromechanical locks that utilize magnetic field forces to operate an actuator of the lock are emerging. Especially, a magnetically-operated actuator switches between a first mechanical state and a second mechanical state using either a first internal magnetization configuration or a second internal magnetization configuration. The magnetically-operated actuator offers many benefits such as a simplified mechanical structure and a reduced electric energy consumption. However, monitoring of functions of the magnetically-operated actuator may be harder. The present invention thus seeks to provide improvements related to the monitoring of the electromechanical lock using the magnetically-operated actuator.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Figure 3:
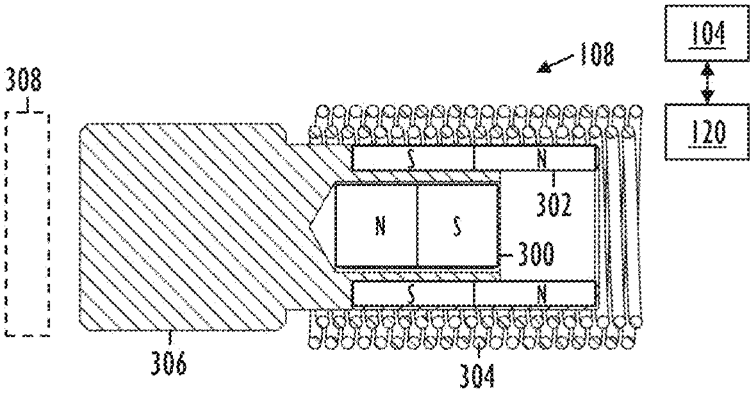
Figure 4A:
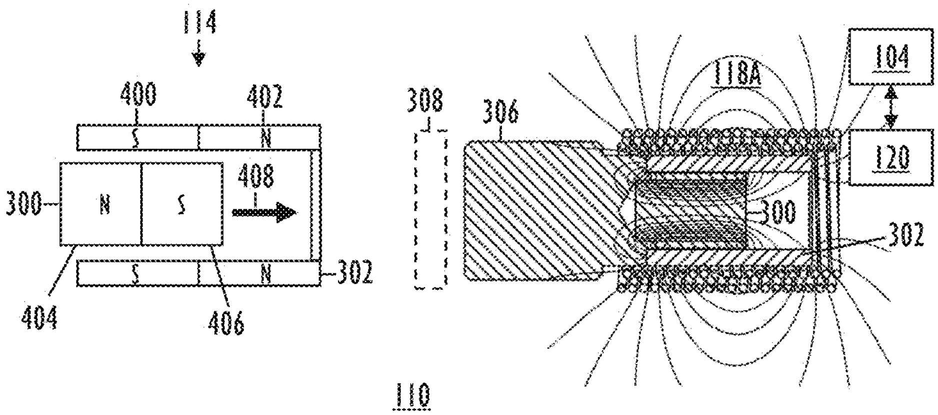
Figure 4B:
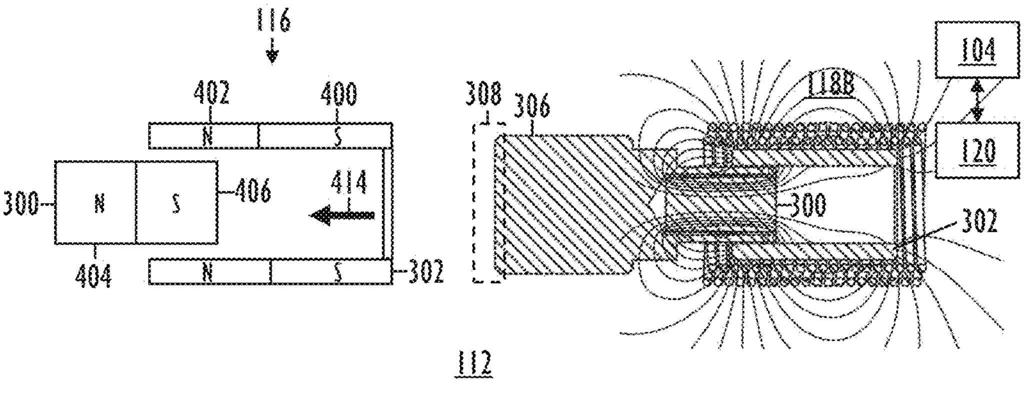
Figure 5A:
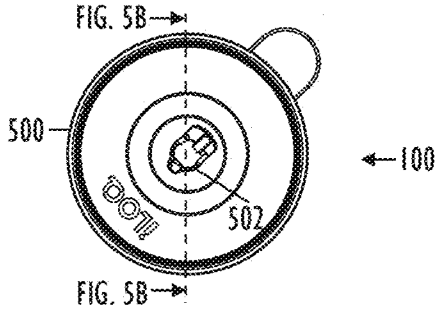
Figure 5B:
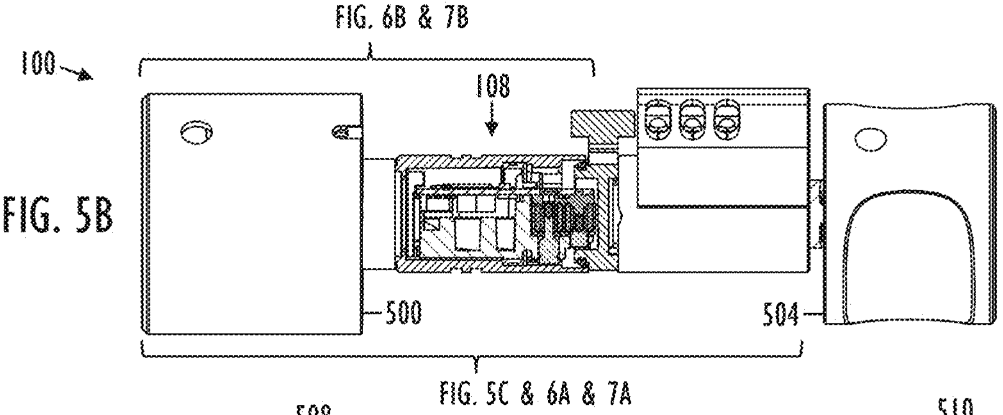
Figure 5C:
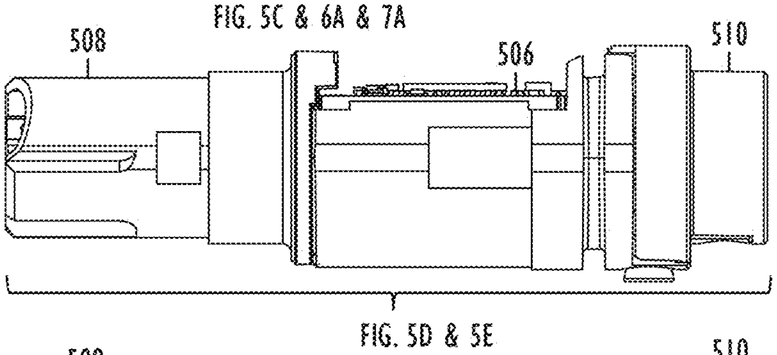
Figure 5D:
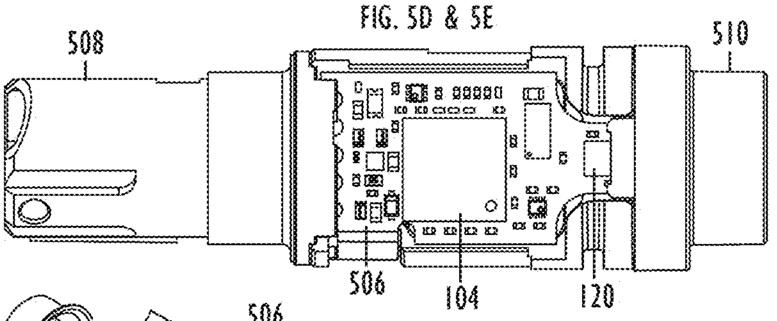
Figure 5E:
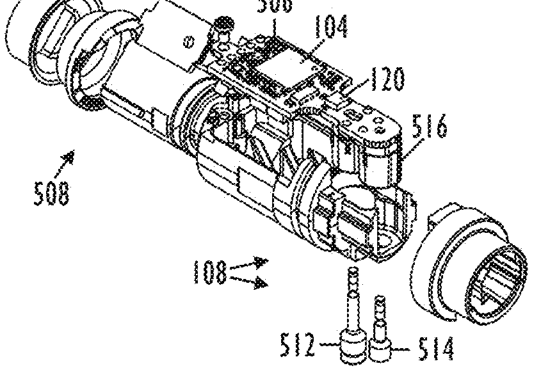
Figure 10:
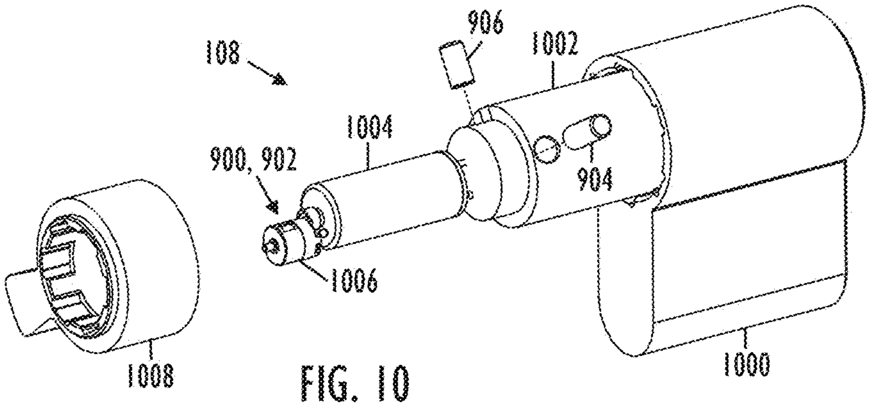
Figure 11A:
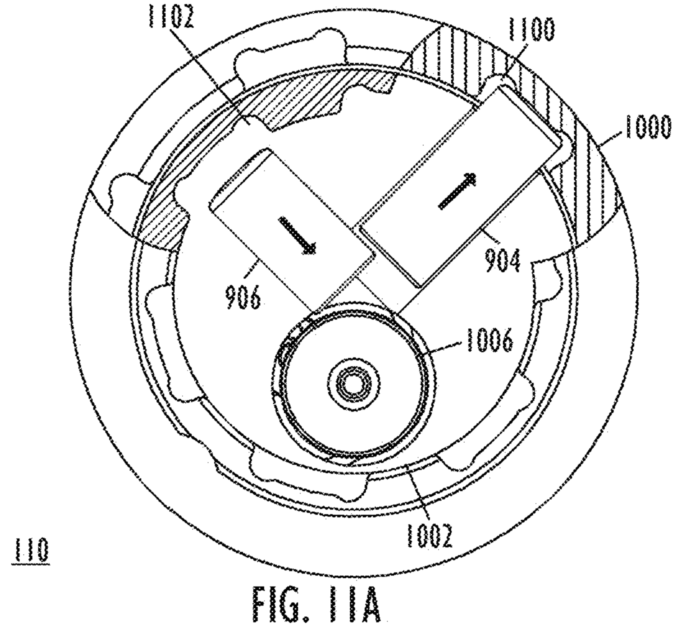
Figure 11B:
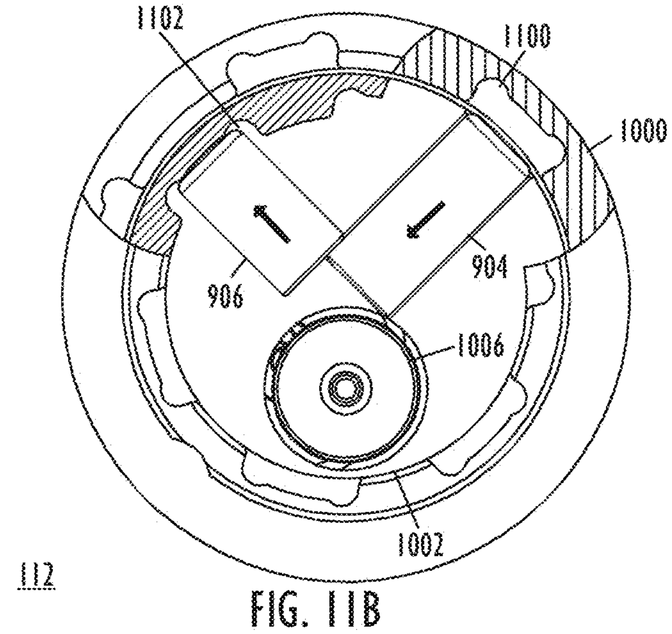
Figure 12:
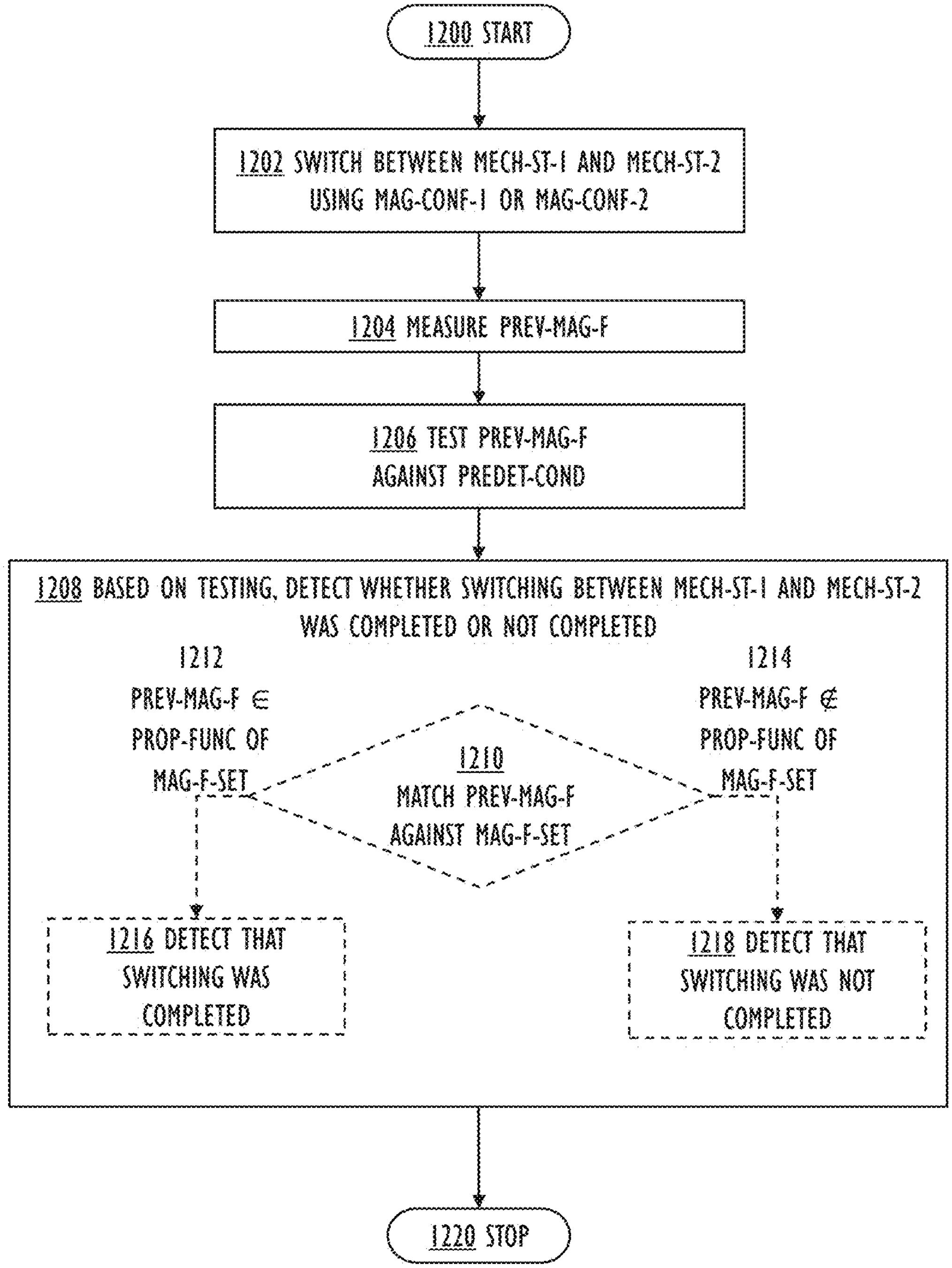

Some embodiments will now be described with reference to the accompanying drawings, in which FIG. 1 illustrates embodiments of an electromechanical lock with a magnetically-operated actuator;

FIG. 2A, FIG. 2B, FIG. 2C, and FIG. 2D illustrate embodiments of proper functions and malfunctions of the magnetically-operated actuator;

FIG. 3, FIG. 4A, and FIG. 4B illustrate further embodiments of the electromechanical lock with the magnetically-operated actuator and its operation;

FIG. 5A, FIG. 5B, FIG. 5C, FIG. 5D, FIG. 5E, FIG. 6A, FIG. 6B, FIG. 7A, and FIG. 7B illustrate further embodiments of the electromechanical lock with the magnetically-operated actuator and its operation;

FIG. 8A, FIG. 8B, FIG. 8C, and FIG. 8D illustrate embodiments measuring magnetic fields of the magnetically-operated actuator;

FIG. 9A, FIG. 9B, FIG. 10, FIG. 11A, and FIG. 11B illustrate further embodiments of the electromechanical lock with the magnetically-operated actuator and its operation; and FIG. 12 is a flow chart illustrating embodiments of a method.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

The applicant, iLOQ Oy, has invented many improvements for the electromechanical locks, such as those disclosed in various European, US, and other regional patent applications and patents, incorporated herein as references in all jurisdictions where applicable.

Let us now study FIG. 1, which illustrates embodiments of an electromechanical lock 100 with a magnetically-operated actuator 108, and FIG. 2A, FIG. 2B, FIG. 2C, and FIG. 2D, which illustrate embodiments of proper functions 200A, 200B and malfunctions 200C, 200D of the magnetically-operated actuator 108.

The electromechanical lock 100 comprises a magnetically-operated actuator 108, a magnetic sensor 120, and a processor 104. Note that the electromechanical lock 100 comprises numerous other structural parts, but only such parts are shown that are relevant to the present embodiments.

In an embodiment the processor 104 comprises one or more memories including computer program code, and one or more microprocessors configured to execute the computer program code to cause operations in the electromechanical lock 100. In an alternative embodiment, the processor 104 comprises a circuitry configured to cause operations in the electromechanical lock 100.

A non-exhaustive list of implementation techniques for the one or more microprocessors and the one or more memories, or the circuitry, includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory (such as a NAND flash or a NOR flash), a solid state disk (SSD), PROM (programmable read-only memory), a suitable semiconductor, or any other means of implementing an electrical computer memory.

The computer program code (or software) may be written by a suitable programming language (such as C, C++, assembler, or machine language, for example), and the resulting executable code may be stored in the one or more memories and run by the one or more microprocessors. The computer program code implements the method/algorithm illustrated in FIG. 12. The computer program code may be stored in a source code form, object code form, executable form, or in some intermediate form, but for use in the one or more microprocessors it is in the executable form.

Now that the basic structure of the electromechanical lock 100 has been described, let us study the dynamics of an operation algorithm of the electromechanical lock 100 with reference also to FIG. 12, which is a flow chart illustrating embodiments of a method performed in relation to the electromechanical lock 100.

In an embodiment, the method is performed in a centralized manner in the electromechanical lock 100. In an alternative embodiment, the method is performed in a distributed manner, wherein a part of the processing is performed in the electromechanical lock 100, and a part of the processing is performed in an external service 130. The external service 130 may be implemented by a networked computer server, which interoperates with the electromechanical lock 100 according to a client-server architecture, a cloud computing architecture, a peer-to-peer system, or another applicable distributed computing architecture. The communication between the external service 130 and the electromechanical lock 100 may be implemented using a wired/wireless standard/proprietary communication protocol. A key 150 for the electromechanical lock 100 may also be used to carry information. Or a user apparatus 140 (such as a mobile phone or another kind of portable apparatus) may directly communicate with the electromechanical lock 100 (using NFC (Near Field Communication) or other short-range radio communication technology, possibly also providing electrical energy for the electromechanical lock 100). The user apparatus 100 may also obtain information related to the electromechanical lock 100 from the external service 130.

The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 1200 and ends in 1220.

Figure 2A:
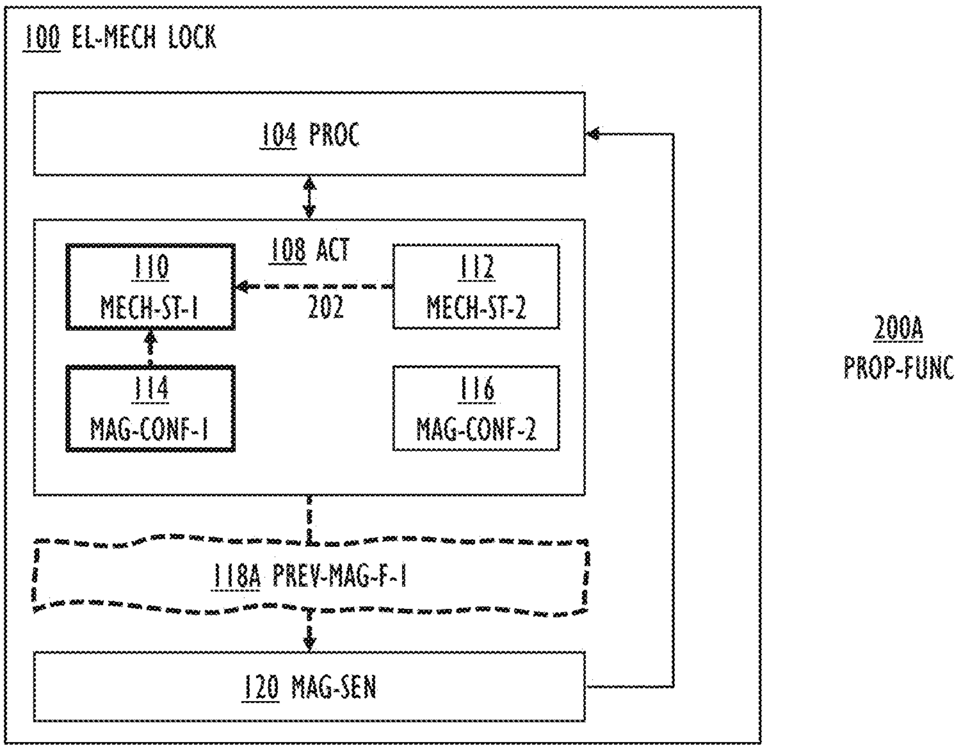
Figure 2B:
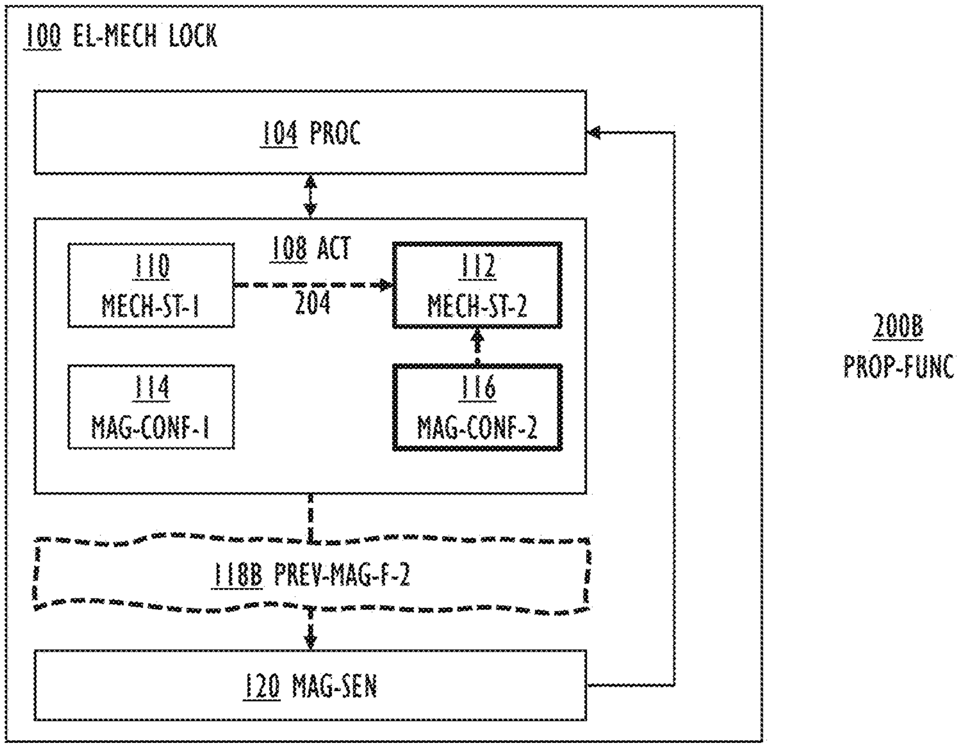

The magnetically-operated actuator 108 is configured to switch 1202 between a first mechanical state 110 and a second mechanical state 112 using either a first internal magnetization configuration 114 or a second internal magnetization configuration 116. This may be implemented as shown in FIG. 2A, the magnetically-operated actuator 108 is switched 202 from the second mechanical state 112 to the first mechanical state 110 using the first internal magnetization configuration 114, and as shown in FIG. 2B, the magnetically-operated actuator 108 is switched 204 from the first mechanical state 110 to the second mechanical state 112 using the second internal magnetization configuration 116. The electromechanical lock 100 may be self-powered, i.e., it may generate all needed electrical energy from the key 150 insertion as described in the patents by the applicant. Another alternative is to use a battery to power the electronics of the electromechanical lock 100. The electromechanical lock 100 may also be such that it does not needs its own power source as all needed electrical energy is harvested from the user apparatus 140 using the NFC technology as described in the patents by the applicant. In such electromechanical locks 100 it is beneficial to save the electrical energy in general. Especially, self-powering and energy harvesting will generate only a limited amount of electric energy during a relatively short time for the operation of the electromechanical lock 100 and its magnetically-operated actuator 108. Therefore, small magnetic field forces (and in some cases small magnetization energies) are used, which may cause a malfunction in the switching 202/204, especially due to wearing and fouling in the parts of the electromechanical lock.

The magnetic sensor 120 is configured to measure 1204 a prevailing magnetic field 118 caused by the magnetically-operated actuator 108.

The processor 104 is configured to command the magnetically-operated actuator 108 to switch 1202 (such as 202 or 204) between the first mechanical state 110 and the second mechanical state 112 using either the first internal magnetization configuration 114 or the second internal magnetization configuration 116.

The processor 104 is configured, after the switching 1202, to command the magnetic sensor 120 to measure 1204 the prevailing magnetic field 118, to test 1206 the prevailing magnetic field 118 against a predetermined condition, and based on the testing 1206, to detect 1208 whether the switching 1202 (such as 202, 204) between the first mechanical state 110 and the second mechanical state 112 was completed or not completed.

FIG. 2A and FIG. 2B each depict a completed switching 202, 204, i.e., proper functions 200A, 200B of the magnetically-operated actuator 108.

Figure 2C:
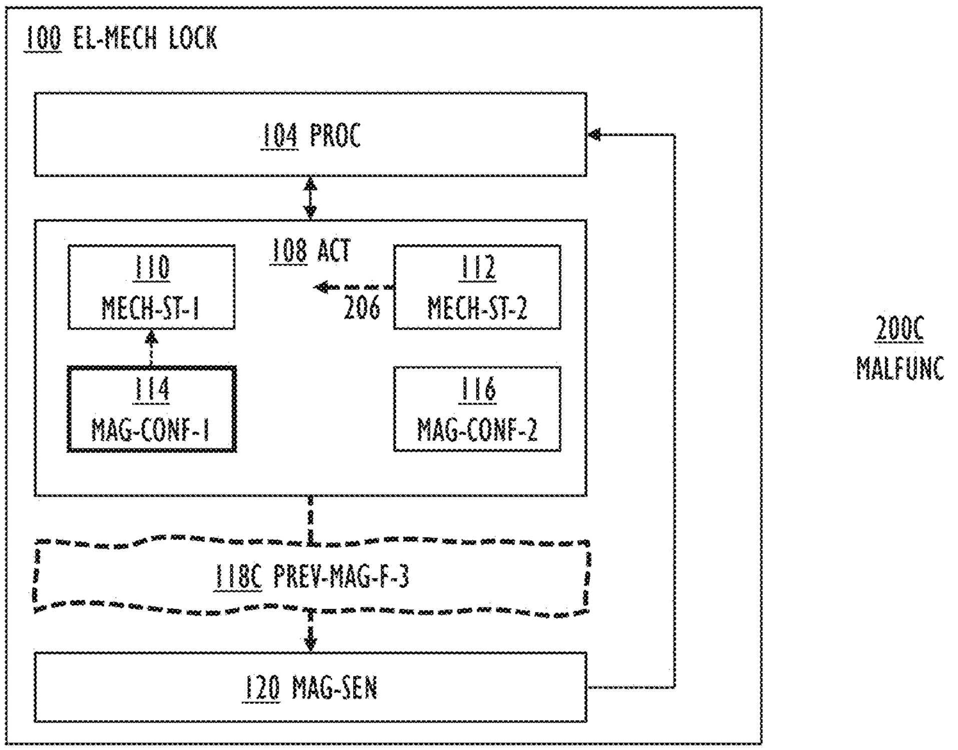

FIG. 2C depicts a not completed switching 206, which corresponds to a malfunction 200C of the magnetically-operated actuator 108, i.e., a failed switching from the second mechanical state 112 to the first mechanical state 110 using the first internal magnetization configuration 114. In other words, FIG. 2C illustrates the malfunction 200C, which was detected instead of the proper function 200A of FIG. 2A.

Figure 2D:
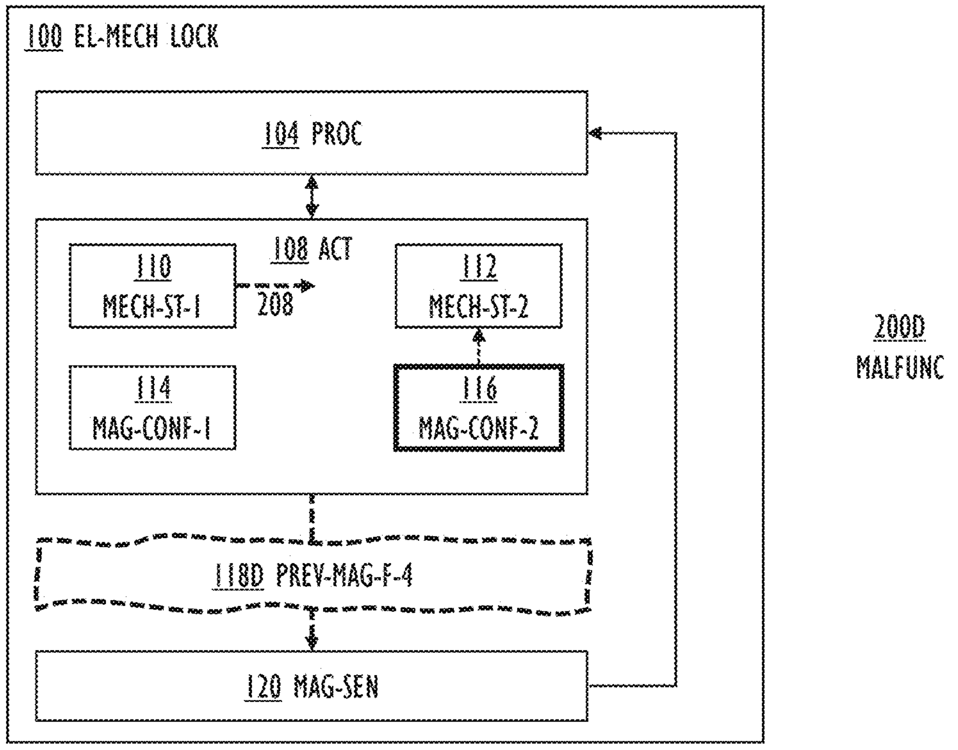

Similarly, FIG. 2D depicts a not completed switching 208, which corresponds to a malfunction 200D of the magnetically-operated actuator 108, i.e., a failed switching from the first mechanical state 110 to the second mechanical state 112 using the second internal magnetization configuration 116. In other words, FIG. 2D illustrates the malfunction 200D, which was detected instead of the proper function 200B of FIG. 2B.

The testing 1206 may be performed in various ways, by checking the prevailing magnetic field 118 against one or more threshold values (of a magnitude of the magnetic field, for example), or by checking the prevailing magnetic field 118 against a set of predefined magnetic fields, for example. The threshold values may be such that a specific magnitude of the prevailing magnetic field 118 needs to be higher than the threshold value in order to detect that the switching 1202 was completed, and otherwise (the magnitude is lower than the threshold) it is detected that the switching 1202 was not completed. The direction of the prevailing magnetic field 118 may also be taken into account.

In this way, the internal state of the magnetically-operated actuator 108 may be detected by analyzing the prevailing magnetic field 118.

In an embodiment, the magnetic sensor 120 comprises at least one of a magnetoresistance sensor, a tunnel magnetoresistance sensor, and/or a magnetometer. The magnetoresistance sensor 120 measures based on the fact that the electrical resistance in a material (such as a ferromagnetic thin film alloy) changes due to the prevailing magnetic field 118. The tunnel magnetoresistance (TMR) sensor 120 measures based on a magnetoresistive effect occurring in a magnetic tunnel junction (made of two ferromagnets separated by a thin insulator), wherein a resistance of the magnetic tunnel junction changes with the prevailing magnetic field 118. The magnetometer 120 measures the prevailing magnetic field 118 (or, more precisely, its magnitude and/or direction, or a relative change of it at a particular location).

In an embodiment, the prevailing magnetic field 118 measured 1204 by the magnetic sensor 120 comprises at least a prevailing magnitude of the magnetic field and/or a prevailing direction of the magnetic field, and the testing 1206 is performed using at least the prevailing magnitude and/or the prevailing direction. The testing may be performed to find a best match between the prevailing magnitude and the predetermined condition, and/or a best match between the prevailing direction and the predetermined condition.

In an embodiment depicted in FIG. 1 and FIG. 12, the processor 104 is, in the testing 1206 and the detecting 1208, configured to match 1210 the prevailing magnetic field 118 against a set 106 of predefined magnetic fields, and based on the matching 1210, detect 1216 that the switching 1202 between the first mechanical state 110 and the second mechanical state 112 was completed, or detect 1218 that the switching 1202 between the first mechanical state 110 and the second mechanical state 112 was not completed.

The matching 1210 may be implemented in various ways.

In a first embodiment, as illustrated in FIG. 12, it is detected that the prevailing magnetic field 118 belongs 1212 to the one or more desired predefined magnetic fields corresponding to proper functions in the set 106, or that the prevailing magnetic field 118 does not belong 1214 to the one or more desired predefined magnetic fields corresponding to proper functions in the set 106. In this way, the proper functions 200A, 200B, of FIG. 2A and FIG. 2B may be detected by matching the prevailing magnetic fields 118A, 118B to the one or more desired predefined magnetic fields corresponding to proper functions in the set 106. Also, the malfunctions 200C, 200D, of FIG. 2C and FIG. 2D may be detected by not matching the prevailing magnetic fields 118C, 118D to the one or more desired predefined magnetic fields corresponding to proper functions in the set 106. It does not matter at which stage the transition 206, 208 between the mechanical states 110, 112 fails, because the prevailing magnetic field 118C, 118D does not match the desired predefined magnetic fields corresponding to proper functions in the set 106. The proper functions have 200A, 200B have discrete correct magnetic fields in the set 106, and all other magnetic fields are wrong indicating the malfunctions 200C, 200D In a second embodiment, the set 106 of the predefined magnetic fields comprises one or more desired predefined magnetic fields corresponding to proper functions 200A, 200B of the magnetically-operated actuator 108, and one or more undesired predefined magnetic fields corresponding to malfunctions 200C, 200D of the magnetically-operated actuator 108. In this way, the proper functions have 200A, 200B have discrete correct magnetic fields in the set 106, but also the malfunctions have discrete wrong magnetic fields indicating the malfunctions 200C, 200D in the set 106.

In a third embodiment, the processor 104 detects as a malfunction an incomplete switching 206, 208 between the first mechanical state 110 and the second mechanical state 112, if the prevailing magnetic field 118 mismatches with the set 106 of the predefined magnetic fields. This may be implemented so that, as in the first embodiment, the prevailing magnetic field 118C or 118D does not match to the one or more desired predefined magnetic fields corresponding to proper functions in the set 106. Or, this may be implemented so that in the second embodiment, the prevailing magnetic field 118C or 118D does not match to any predefined magnetic field in the set 106 of the predefined magnetic fields comprising both the one or more desired predefined magnetic fields corresponding to the proper functions 200A, 200B of the magnetically-operated actuator 108, and the one or more undesired predefined magnetic fields corresponding to the malfunctions 200C, 200D of the magnetically-operated actuator 108. In other words, in the second embodiment, the mismatch indicates an unexpected malfunction (not defined for the set 106).

In a fourth embodiment, as already explained with reference to FIG. 2A, FIG. 2B, FIG. 2C, and FIG. 2D, the set 106 of the predefined magnetic fields comprises four predefined magnetic fields, wherein two desired predefined magnetic fields correspond to the proper functions 200A, 200B of the magnetically-operated actuator 108, and two undesired predefined magnetic fields correspond to the malfunctions 200C, 200D of the magnetically-operated actuator 108. Also, in an embodiment, as already explained, a first desired predefined magnetic field corresponds to the first mechanical state 110 due to the first internal magnetization configuration 114, a second desired predefined magnetic field corresponds to the second mechanical state 112 due to the second internal magnetization configuration 116, a first undesired predefined magnetic field corresponds to the first mechanical state 110 due to the second internal magnetization configuration 116, and a second undesired predefined magnetic field corresponds to the second mechanical state 112 due to the first internal magnetization configuration 114.

In an embodiment illustrated in FIG. 1, the electromechanical lock comprises an interface 102 to indicate whether the switching 1202 between the first mechanical state 110 and the second mechanical state 112 was completed or not completed. To increase safety, the electromechanical lock 102 may be configured so that if a malfunction is detected, the mechanical state is returned to the locked state (if possible and not prevented by a mechanical failure). The interface 102 may transmit information of the completed or not completed switching 1202 to the external service 130. Alternatively, or additionally, the interface 102 may provide the information of the completed or not completed switching to a user interface 122 related to electromechanical lock, whereby the user interface 122 may indicate the completed or not completed switching to a user. The user interface 122 may be a part of the electromechanical lock 100, such as one or more leds indicating the completed or not completed status with a specific colour of the led, a specific blinking frequency, etc. The user interface 122 may also be a part of the key 150, such as one or more leds. The user interface 122 may also be a part of the user apparatus 140 communicating directly with the electromechanical lock 100, through an NFC (Near Field Communication) interface, for example, or indirectly with the electromechanical lock 100 through the external service 130.

In an embodiment, numbers of the completed and not completed switching 1202 are analyzed in order to detect a service need (such as precautionary or periodical service) for the electromechanical lock 100. The analysis may be made by the processor 104, and/or by the external service 130. The measured prevailing magnetic field 118 caused by each switching 1202 may also be transferred to the external service 130, and the external service 130 may determine, based on the measured magnetic fields 118 and/or the numbers of the completed and not completed switching 1202 if and when precautionary service or periodical service is needed in the electromechanical lock 100 so that malfunctions may be prohibited.

Now that the basic functionality of the electromechanical lock 100 has been explained, let us study various embodiments in different kinds of implementations of the magnetically-operated actuator 108.

FIG. 3 illustrates further embodiments of the electromechanical lock 100 with the magnetically-operated actuator 108, and FIG. 4A, and FIG. 4B illustrate its operation. This embodiment is based on the electromechanical lock described in EP 3825496 A1, incorporated herein as reference in all jurisdictions where applicable. A complete discussion of all details is not repeated here, but the reader is advised to consult that publication.

The magnetically-operated actuator 108 comprises a movable permanent magnet 300, a stationary permanent semi-hard magnet 302, and an electrically powered magnetization coil 304.

The magnets 300, 302 are "permanent", i.e., they are made from a material that is magnetized and creates its own persistent magnetic field. Permanent magnets are made from magnetically "hard" materials (like ferrite) that are processed in a strong magnetic field during manufacture to align their internal microcrystalline structure, which makes them very hard to demagnetize. Magnetically "soft" materials (like annealed iron) can be magnetized but do not tend to stay magnetized. To demagnetize a saturated magnet, a magnetic field with an intensity above a coercivity of the material of the magnet is applied. Magnetically "hard" materials have a high coercivity, whereas magnetically "soft" materials have a low coercivity. Magnetically "semi-hard" materials include alloys whose coercivity is between the "soft" magnetic materials and "hard" magnetic materials. In an embodiment, the movable permanent magnet 300 is made of "magnetically" hard material. In an embodiment, the movable permanent magnet 300 is an SmCo (samarium-cobalt alloy) magnet, whose coercivity is 40-2800 kA/m. In an embodiment, the stationary permanent semi-hard magnet 302 is an AlNiCo (aluminium-nickel-cobalt alloy) magnet, whose coercivity is 30-150 kA/m. Note that according to some classifications, the AlNiCo magnet is counted as a hard magnet, but in this application, the semi-hard magnet is such magnet that is not too soft, so that it easily becomes demagnetized, but not too hard either, so that its polarity may be reversed with the electrically powered magnetization coil 304 using an appropriate current.

The movable permanent magnet 300 moves between the first mechanical state 110 illustrated in FIG. 4A and the second mechanical state 112 illustrated in FIG. 4B.

The magnetically-operated actuator 108 may achieve its operation for the electromechanical lock 100 from a locked state to an openable state in two different ways: by changing an uncoupled engagement to a coupled engagement, or by stopping to block a movement and instead enable the movement.

First, let us consider a pin 306 and a notch 308 as the engagement. Then, FIG. 4A illustrates that the first position of the movable permanent magnet 300 keeps the engagement 306, 308 in the electromechanical lock 100 uncoupled, whereby the electromechanical lock 100 remains in the locked state, whereas FIG. 4B illustrates that the second position of the movable permanent magnet 300 makes the engagement 306, 308 in the electromechanical lock 100 coupled, whereby the electromechanical lock 100 changes to an openable state.

Next, let us consider the pin 306 and the notch 308 as a mechanism blocking or enabling the movement. Then, FIG. 4B illustrates that the first position of the movable permanent magnet 300 blocks the movement in the electromechanical lock 100, whereby the electromechanical lock 100 remains in the locked state, whereas FIG. 4A illustrates that the second position of the movable permanent magnet 300 enables the movement in the electromechanical lock 100, whereby the electromechanical lock 100 changes to an openable state.

The magnetic pole model has the following pole naming conventions: the North pole N and the South pole S. The opposite poles (S-N) attract each other, whereas similar poles (N-N or S-S) repel each other. Even though magnetism is a far more complex physical phenomenon (which, besides magnetic poles, may also be modelled with atomic currents), the magnetic pole model enables one to understand the way the magnets 300, 302 operate in the embodiments. As shown in FIG. 4A, the movable permanent magnet 300 has poles 404, 406, and the stationary permanent semi-hard magnet 302 poles 400, 402.

The electrically powered magnetization coil 304 is positioned adjacent to the stationary permanent semi-hard magnet 302 to switch 1202 a polarity of the stationary permanent semi-hard magnet 302 between the first internal magnetization configuration 114 illustrated in FIG. 4A and the second internal magnetization configuration 116 illustrated in FIG. 4B.

In an embodiment, the electrically powered magnetization coil 304 is wrapped around the stationary permanent semi-hard magnet 302, and a flow of electricity in one direction causes the first internal magnetization configuration 114, and a flow of the electricity in an opposite direction causes the second internal magnetization configuration 116.

The first internal magnetization configuration 114 of the stationary permanent semi-hard magnet 302 attracts the movable permanent magnet 300 to the first mechanical state 110. As shown in FIG. 4A, the S pole 406 of the movable permanent magnet 300 is pulled towards the N pole 402 of the stationary permanent semi-hard magnet 302, and the N pole 404 of the movable permanent magnet 300 is pulled towards the S pole 400 of the stationary permanent semi-hard magnet 302.

The second internal magnetization configuration 116 of the stationary permanent semi-hard magnet 302 repels the movable permanent magnet 300 to the second mechanical state 112. As shown in FIG. 4B, the poles 400, 402 of the stationary permanent semi-hard magnet 302 have been reversed by the electrically powered magnetization coil 304, and the S pole 406 of the movable permanent magnet 300 is pushed by the S pole 400 of the stationary permanent semi-hard magnet 302, and the N pole 404 of movable permanent magnet 300 is pushed by the N pole 402 of the stationary permanent semi-hard magnet 302.

In more general terms, in the first internal magnetization configuration 114, a first pole of the stationary permanent semi-hard magnet 302 attracts a first pole of the movable permanent magnet 300, and a second pole of the stationary permanent semi-hard magnet 302 attracts a second pole of the movable permanent magnet 300, whereas in the second internal magnetization configuration 116, a reversed first pole of the stationary permanent semi-hard magnet 302 repels the first pole of the movable permanent magnet 300, and a reversed second pole of the stationary permanent semi-hard magnet 302 repels the second pole of the movable permanent magnet 300.

In an embodiment, the stationary permanent semi-hard magnet 302 is formed and positioned to at least partly surround the movable permanent magnet 300 in the first mechanical state 110 and in the second mechanical state 112. This may be implemented so that the stationary permanent semi-hard magnet 302 is of a tubular shape, and the movable permanent magnet 300 is placed inside a hollow in a pin 306 moving inside of the tubular shape.

Let us next study FIG. 5A, FIG. 5B, FIG. 5C, FIG. 5D, and FIG. 5E, which illustrate an electromechanical lock 100 with a similar operating principle as described in connection with FIG. 3, FIG. 4A, and FIG. 4B, but with such an magnetically-operable actuator 108 that achieve its operation from the locked state to the openable state using simultaneously the described different ways: by changing the uncoupled engagement to the coupled engagement, and by stopping to block the movement and instead enable the movement. In other words, the coupling/uncoupling and the enabling/disabling sets the electromechanical lock 100 to a locked state, lets the electromechanical lock 100 to remain in a locked state, or changes the electromechanical lock 100 to an openable state.

Figure 6A:
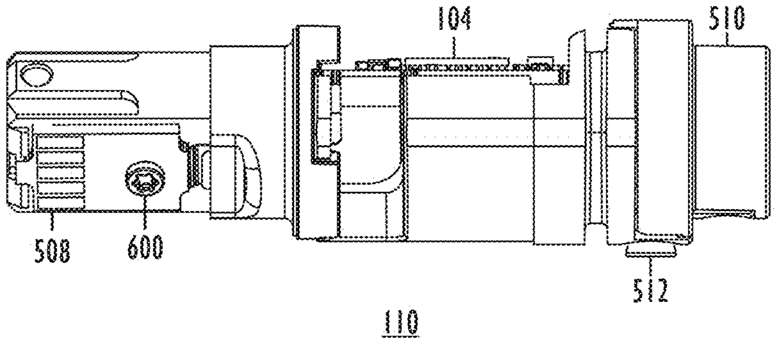
Figure 6B:
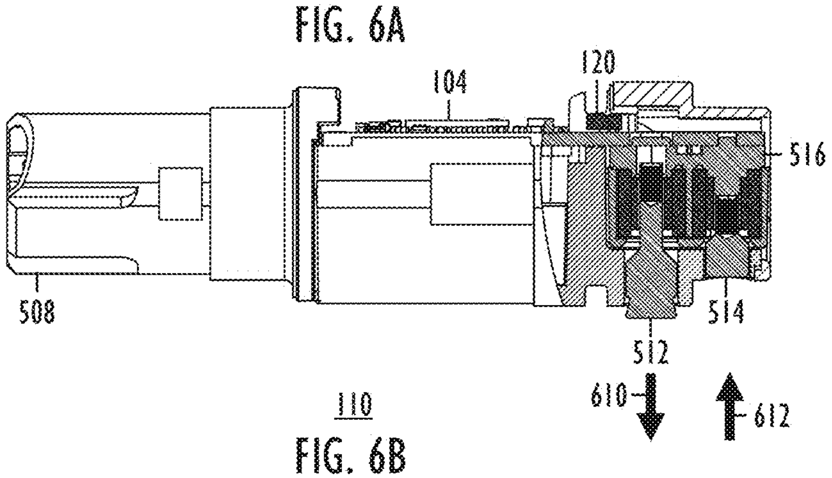
Figure 7A:
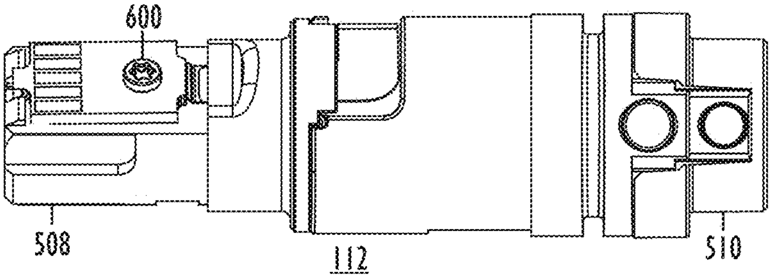
Figure 7B:
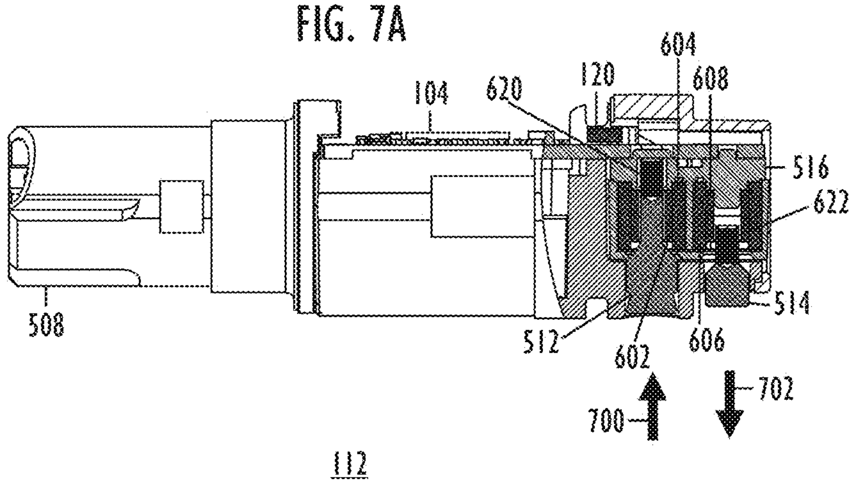

FIG. 6A and FIG. 6B illustrate the electromechanical lock 100 in the locked state, i.e., in the first mechanical state 110, whereas FIG. 7A and FIG. 7B illustrate the electromechanical lock 100 in the openable state, i.e., in the second mechanical state 112.

The electromechanical lock 100 installed in a door comprises an outside knob 500 with a keyhole 502 towards outdoors, an inside knob 504 towards indoors, and other mechanics such as a lock body comprising the magnetically-operable actuator 108 between the two knobs 500, 504.

The magnetically-operable actuator 108 comprises a printed circuit board 506 embedded with required electronics including the processor 104 and the magnetic sensor 120, and a component 516 housing two pins: a locking pin 512, and an engagement pin 514.

As shown in FIG. 7B, each of the pins 512, 514 is coupled to the movable permanent magnets 620, 622 (each corresponding to the earlier described movable permanent magnet 300), which move inside the (tubular) stationary permanent semi-hard magnets 602, 608 (each corresponding to the earlier described stationary permanent semi-hard magnet 302) controlled by the electrically powered magnetization coils 604, 606 (each corresponding to the earlier described electrically powered magnetization coil 304).

In FIG. 6A, the knob 508 is in the locked position (note the position of a screw 600), and FIG. 6B illustrates the locked state 110, wherein the locking pin 512 is pushed out 610 and thereby blocks the movement, and the engagement pin 514 is pulled in 612 and is thereby uncoupled.

In FIG. 7A, the knob 508 is in the openable position (note again the position of the screw 600), and FIG. 7B illustrates the openable state 112, wherein the locking pin 512 is pulled in 700 enabling the movement, and the engagement pin 514 is pushed out 702 and is thereby coupled.

FIG. 8A, FIG. 8B, FIG. 8C, and FIG. 8D illustrate embodiments measuring magnetic fields 800, 802, 804, 806 (such as their magnitude and direction) of the magnetically-operated actuator 108.

Note that for the sake of simplicity, the simulations only show the movable permanent magnet 620 of the locking pin 512 and its stationary permanent semi-hard magnet 602, although the simulations show the magnetic fields 800, 802, 804, 806 as generated also by the engagement pin 514 and its magnets 608, 622.

Figure 8A:
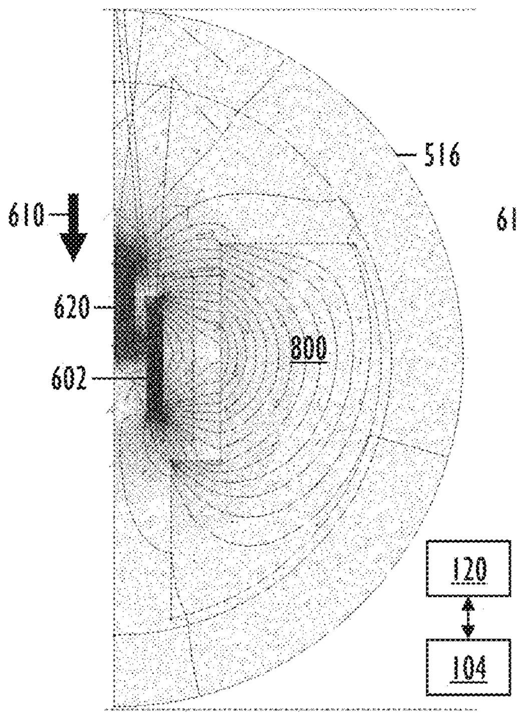

In FIG. 8A (corresponding to locked state 110 of FIG. 6B), the locking pin 512 is pushed out 610 and the engagement pin 514 is pulled in.

Figure 8B:
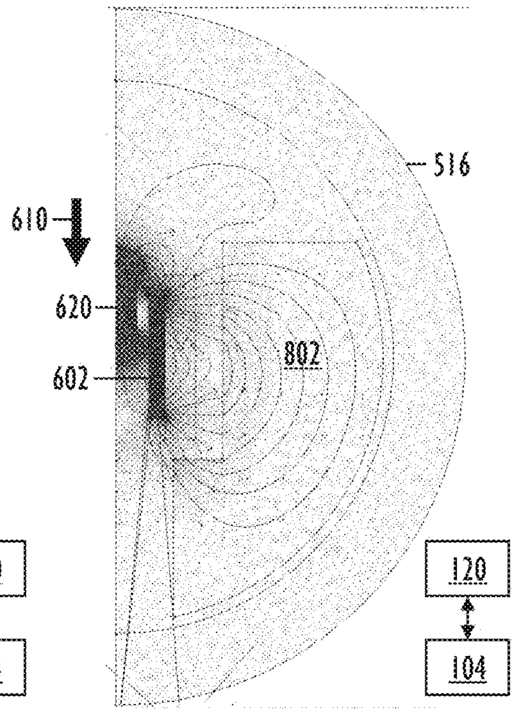

In FIG. 8B, the locking pin 512 remains pushed out 610 and the engagement pin 514 is started to push out.

Figure 8C:
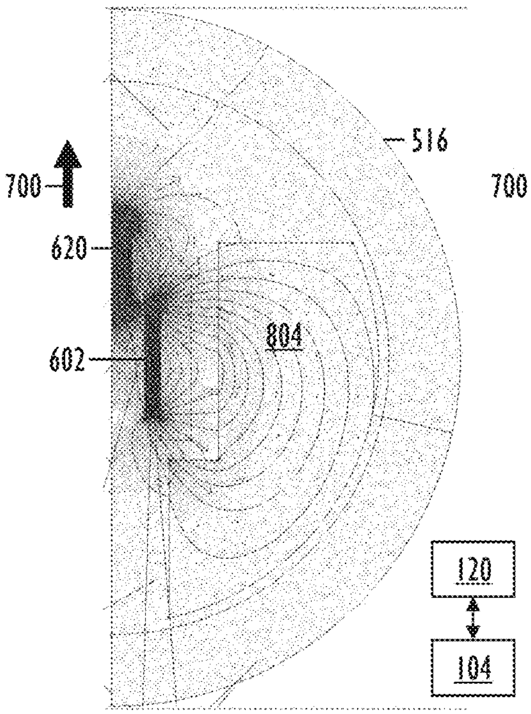

In FIG. 8C (corresponding to the openable state 112 of FIG. 7B), the locking pin 512 is pulled in 700, and the engagement pin 514 remains pushed out.

Figure 8D:
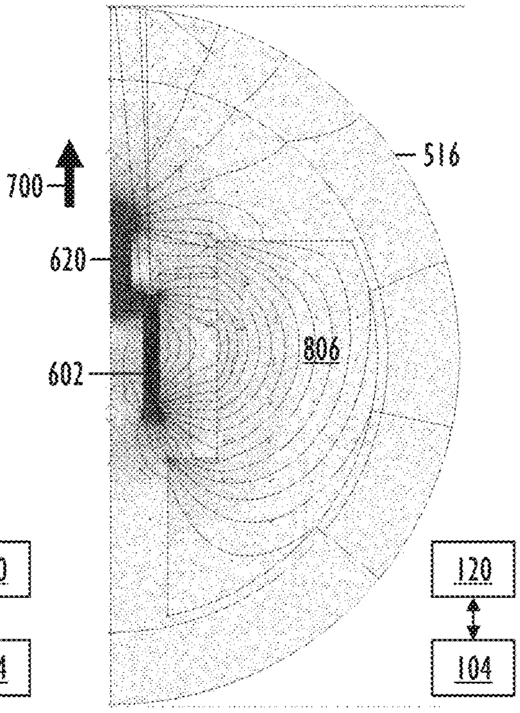

In FIG. 8D, the locking pin 512 remains pulled in 700, and the engagement pin 514 is started to pull in.

Figure 9A:
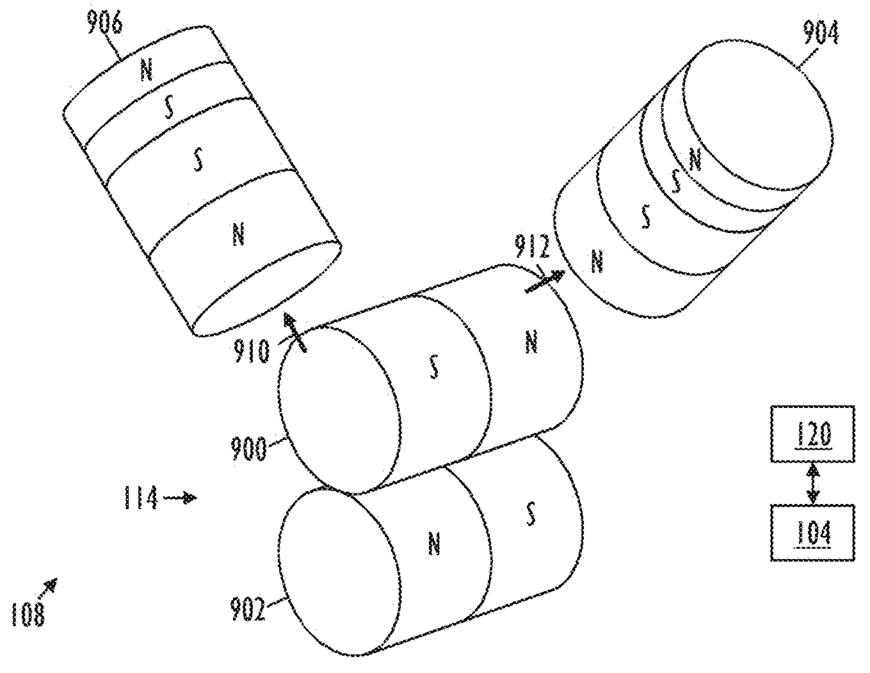
Figure 9B:
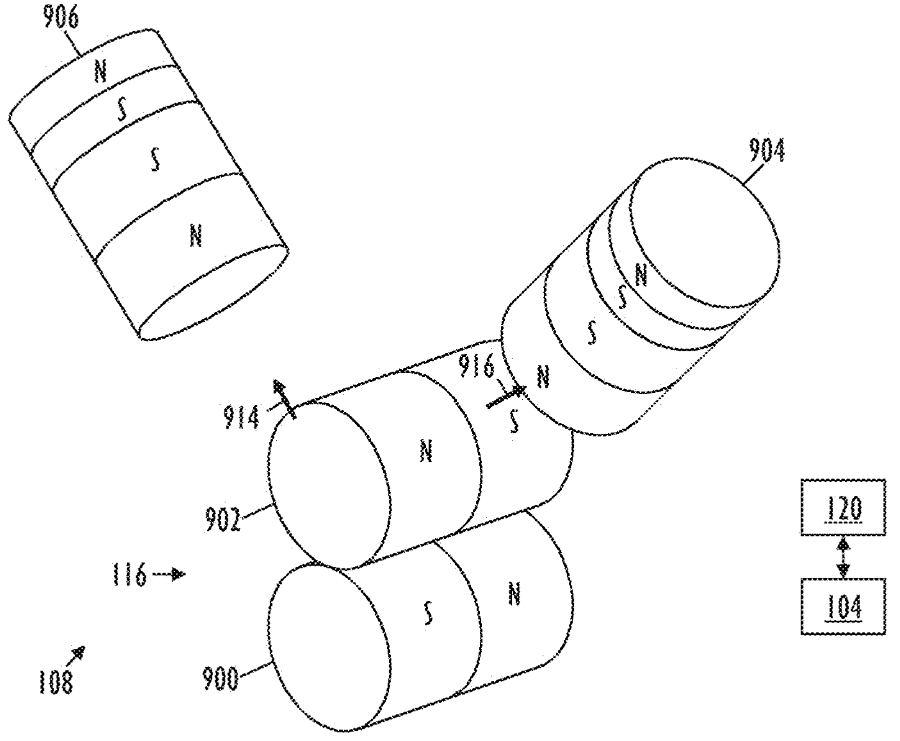

Let us next study another embodiment of the electromechanical lock 100 with reference to FIG. 9A, FIG. 9B and FIG. 10 illustrating its structure, and FIG. 11A and FIG. 11B illustrating its operation. This embodiment is based on the electromechanical lock described in EP 3480396 A1, incorporated herein as reference in all jurisdictions where applicable. A complete discussion of all details is not repeated here, but the reader is advised to consult that publication.

The magnetically-operated actuator 108 comprises a permanent magnet arrangement 900, 902 movable from a first position to a second position by electric power, a locking pin 904, and an engagement pin 906. Depending on the position of the permanent magnet arrangement 900, 902, each pin 904, 906 is either being pushed out or pulled in by the magnetic field forces (S-N and N-N in FIG. 9A, or N-N and S-N in FIG. 9B).

As shown in FIG. 9A and FIG. 9B the permanent magnet arrangement 900, 902 comprises a first permanent magnet 900 and a second permanent magnet 902 configured and positioned side by side so that opposite poles of the first permanent magnet 900 and the second permanent magnet 902 are side by side. The permanent magnet arrangement 900, 902 operates so that from the position shown in FIG. 9A it is rotated 180 degrees into the position shown in FIG. 9B.

In the first position illustrated in FIG. 9A, the permanent magnet arrangement 900, 902 is configured and positioned to direct a near magnetic field 910, 912 towards the pins 904, 906, and thereby causing the first internal magnetization configuration 114 to switch 1202 from the second mechanical state 112 to the first mechanical state 110.

In the second position illustrated in FIG. 9B, the permanent magnet arrangement 900, 902 is configured and positioned to direct a reversed near magnetic field 914, 916 towards the pins 904, 906, and thereby causing the second internal magnetization configuration 116 to switch 1202 from the first mechanical state 110 to the second mechanical state 112.

As shown in FIG. 10, the electromechanical lock 100 comprises a lock body 1000, a first axle 1002, the locking pin 904, the engagement pin 906, an electric motor 1004 (to cause the rotation of the permanent magnet arrangement 900, 902), a drive head 1006 (housing the permanent magnet arrangement 900, 902) and a mechanism 1008 to couple with a latch (or a lock bolt) moving in and out (of a door fitted with the electromechanical lock 100, for example).

The magnetically-operable actuator 108 of FIG. 10 also achieves its operation from the locked state to the openable state using simultaneously the described different ways: by changing the uncoupled engagement to the coupled engagement, and by stopping to block the movement and instead enable the movement. In the first mechanical state 110 illustrated in FIG. 11A, the locking pin 904 is in a notch 1100, and the engagement pin 906 is not in a notch 1102 when the electromechanical lock 100 is in the locked state. In the second mechanical state 112 illustrated in FIG. 11B, the locking pin 904 is withdrawn from the notch 1100, and the engagement pin 902 enters the notch 1102, whereby the electromechanical lock is set in the openable state.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An electromechanical lock comprising:

a magnetically-operated actuator to switch between a first mechanical state and a second mechanical state using either a first internal magnetization configuration or a second internal magnetization configuration;

a magnetic sensor to measure a prevailing magnetic field caused by the magnetically-operated actuator; and a processor to command the magnetically-operated actuator to switch between the first mechanical state and the second mechanical state using either the first internal magnetization configuration or the second internal magnetization configuration, and after the switching, to command the magnetic sensor to measure the prevailing magnetic field, to test the prevailing magnetic field against a set of the predefined magnetic fields, and based on the testing, to detect whether the switching between the first mechanical state and the second mechanical state was completed or not completed, wherein the set of the predefined magnetic fields comprises four predefined magnetic fields, wherein two desired predefined magnetic fields correspond to proper functions of the magnetically-operated actuator, and two undesired predefined magnetic fields correspond to malfunctions of the magnetically-operated actuator.

2. The electromechanical lock of claim 1, wherein the processor detects as a malfunction an incomplete switching between the first mechanical state and the second mechanical state, if the prevailing magnetic field mismatches with the set of the predefined magnetic fields.

3. The electromechanical lock of claim 1, wherein a first desired predefined magnetic field corresponds to the first mechanical state due to the first internal magnetization configuration, a second desired predefined magnetic field corresponds to the second mechanical state due to the second internal magnetization configuration, a first undesired predefined magnetic field corresponds to the first mechanical state due to the second internal magnetization configuration, and a second undesired predefined magnetic field corresponds to the second mechanical state due to the first internal magnetization configuration.

4. The electromechanical lock of claim 1, wherein the prevailing magnetic field measured by the magnetic sensor comprises at least a prevailing magnitude of the magnetic field and/or a prevailing direction of the magnetic field, and the testing is performed using at least the prevailing magnitude and/or the prevailing direction.

5. The electromechanical lock of claim 1, comprising:

an interface to indicate whether the switching between the first mechanical state and the second mechanical state was completed or not completed.

6. The electromechanical lock of claim 5, wherein the interface transmits information of the completed or not completed switching to an external service.

7. The electromechanical lock of claim 1, wherein numbers of the completed and not completed switching are analyzed in order to detect a service need for the electromechanical lock.

8. The electromechanical lock of claim 7, wherein the external service is configured to analyze the measured prevailing magnetic field in order to detect the service need for the electromechanical lock.

9. The electromechanical lock of claim 8, wherein the detection is performed before the malfunction.

10. The electromechanical lock of claim 1, wherein the magnetic sensor comprises at least one of a magnetoresistance sensor, a tunnel magnetoresistance sensor, and/or a magnetometer.

11. The electromechanical lock of claim 1, wherein the magnetically-operated actuator comprises:

a movable permanent magnet to move between the first mechanical state and the second mechanical state;

a stationary permanent semi-hard magnet; and an electrically powered magnetization coil positioned adjacent to the stationary permanent semi-hard magnet to switch a polarity of the stationary permanent semi-hard magnet between the first internal magnetization configuration and the second internal magnetization configuration, wherein the first internal magnetization configuration of the stationary permanent semi-hard magnet attracts the movable permanent magnet to the first mechanical state, and the second internal magnetization configuration of the stationary permanent semi-hard magnet repels the movable permanent magnet to the second mechanical state.

12. The electromechanical lock of claim 11, wherein the electrically powered magnetization coil is wrapped around the stationary permanent semi-hard magnet, and a flow of electricity in one direction causes the first internal magnetization configuration, and a flow of the electricity in an opposite direction causes the second internal magnetization configuration.

13. The electromechanical lock of claim 11, wherein the first position of the movable permanent magnet keeps an engagement in the electromechanical lock uncoupled, whereby the electromechanical lock remains in a locked state, whereas the second position of the movable permanent magnet makes the engagement in the electromechanical lock coupled, whereby the electromechanical lock changes to an openable state, or wherein the first position of the movable permanent magnet blocks a movement in the electromechanical lock, whereby the electromechanical lock remains in a locked state, whereas the second position of the movable permanent magnet enables the movement in the electromechanical lock, whereby the electromechanical lock changes to an openable state.

14. The electromechanical lock of claim 1, wherein the magnetically-operated actuator comprises:

a permanent magnet arrangement movable from a first position to a second position by electric power, wherein in the first position, the permanent magnet arrangement is configured and positioned to direct a near magnetic field caused by the first internal magnetization configuration to switch from the second mechanical state to the first mechanical state, whereas in the second position, the permanent magnet arrangement is configured and positioned to direct a reversed near magnetic field caused by the second internal magnetization configuration to switch from the first mechanical state to the second mechanical state.

15. A method for using the electromechanical lock of claim 1 comprising:

switching, in a magnetically-operated actuator, between a first mechanical state and a second mechanical state using either a first internal magnetization configuration or a second internal magnetization configuration; after the switching, measuring, by a magnetic sensor, a prevailing magnetic field caused by the magnetically-operated actuator, testing the prevailing magnetic field against a set of the predefined magnetic fields, and based on the testing, detecting whether the switching between the first mechanical state and the second mechanical state was completed or not completed, wherein the set of the predefined magnetic fields comprises four predefined magnetic fields, wherein two desired predefined magnetic fields correspond to proper functions of the magnetically-operated actuator, and two undesired predefined magnetic fields correspond to malfunctions of the magnetically-operated actuator.

* * * * *